Nov. 8, 1955  R. G. H. SIU  2,722,718
METHOD OF MAKING FINE INHERENTLY CURLY GLASS FILAMENTS
Filed Aug. 21, 1950  2 Sheets-Sheet 1

INVENTOR
Ralph G. H. Siu
ATTORNEY

Nov. 8, 1955   R. G. H. SIU   2,722,718
METHOD OF MAKING FINE INHERENTLY CURLY GLASS FILAMENTS
Filed Aug. 21, 1950   2 Sheets-Sheet 2
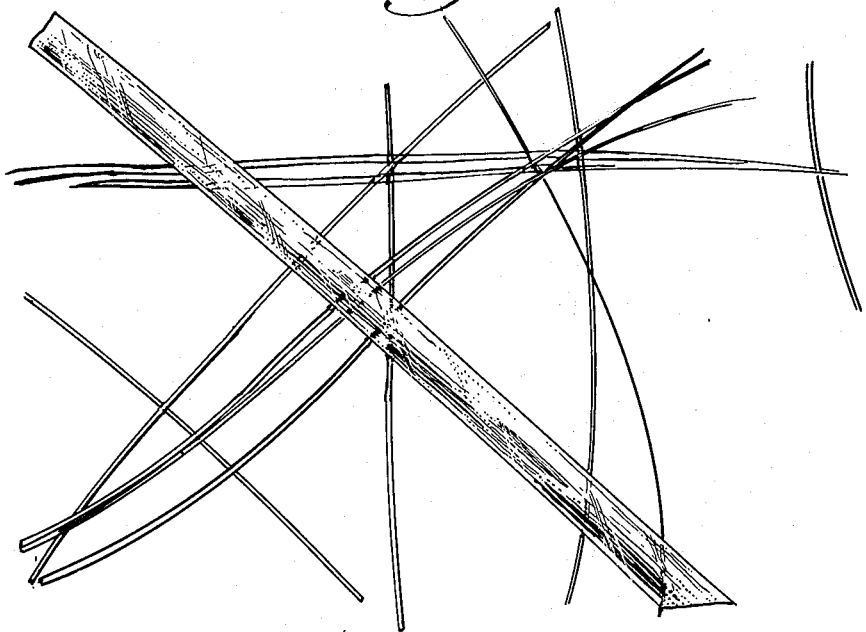
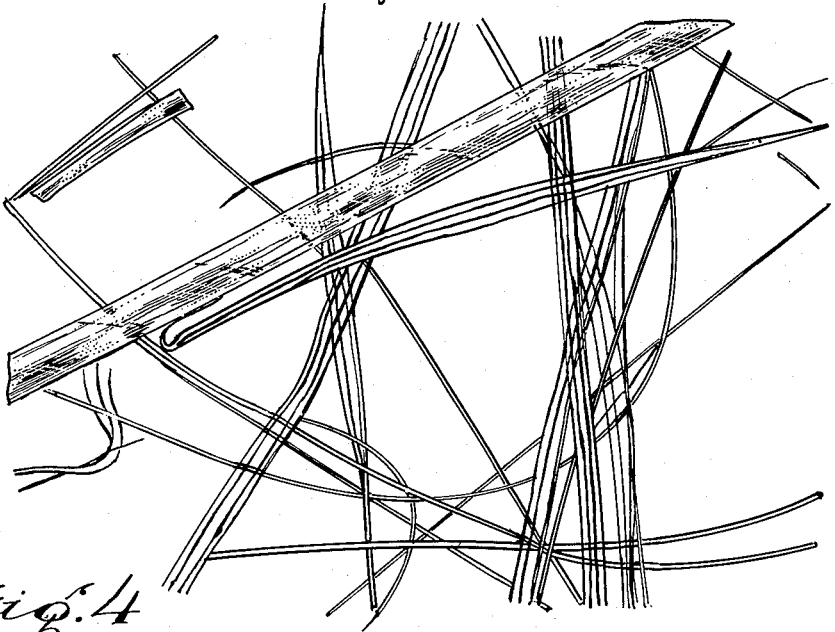
INVENTOR
Ralph G. H. Siu
BY
ATTORNEY

United States Patent Office 2,722,718
Patented Nov. 8, 1955

2,722,718
METHOD OF MAKING FINE INHERENTLY CURLY GLASS FILAMENTS

Ralph G. H. Siu, Philadelphia, Pa.

Application August 21, 1950, Serial No. 180,686

5 Claims. (Cl. 18—47.3)

(Granted under Title 35, U. S. Code (1952), sec. 266)

The invention described herein, if patented, may be manufactured by or for the Government for governmental purposes without the payment to me of any royalty thereon.

This application is a continuation in part of my abandoned application Serial No. 110,663, filed August 16, 1949, entitled "Method of Making Filamentous Masses Containing Glass Filaments, Etc."

This invention relates to a method of making glass filaments, especially inherently curly glass filaments, by melt spraying. The invention is an improvement over the method broadly disclosed in the R. K. Ladisch Patent No. 2,571,457 dated October 16, 1951.

The art of producing straight glass fibers by extrusion of molten glass masses is well known. While the fibers may be obtained in widely varying diameters, they are always straight in short lengths and hence are much less adaptable for use as filling materials than curled, kinky or crimped filaments. Crimped glass fibers require the use of a special crimping machine and step, as disclosed for example in the Dockerty Patent No. 2,395,371, dated February 11, 1946. To obtain curly glass filaments, it has been necessary in the past to blow the extruded fibers against a strong jet of gas (air, nitrogen, carbon dioxide, steam, etc.) which causes the fibers to assume a curly form. However, this process is more expensive than the process of the invention.

In accordance with the invention, straight glass filaments and also inherently curly glass filaments are made from molten glass forced through a peculiar type of nozzle which is so made as to cause a whirling jet of gas to move with constantly increasing velocity to a "Vertex" or point just outside of the annular discharge opening of the nozzle. This whirling gas jet at the "Vertex" theoretically attains infinite velocity and actually attains a very high velocity which may be supersonic (a velocity higher than the speed of sound in air at sea level) and disrupts the molten glass stream forming filaments of very small diameter, viz., 100 microns down to one micron or even smaller. The construction of the preferred nozzle is generally disclosed in the Ladisch Patent No. 1,811,637 dated June 23, 1931.

In the accompanying drawings forming a part of this specification—

Fig. 3 is a full size reproduction of a photomicrograph (158×) of glass fibers made pursuant to the invention; and Fig. 4 is a view like Fig. 3, with the same magnification, showing other fibers also embodying the invention.

Figure 1:
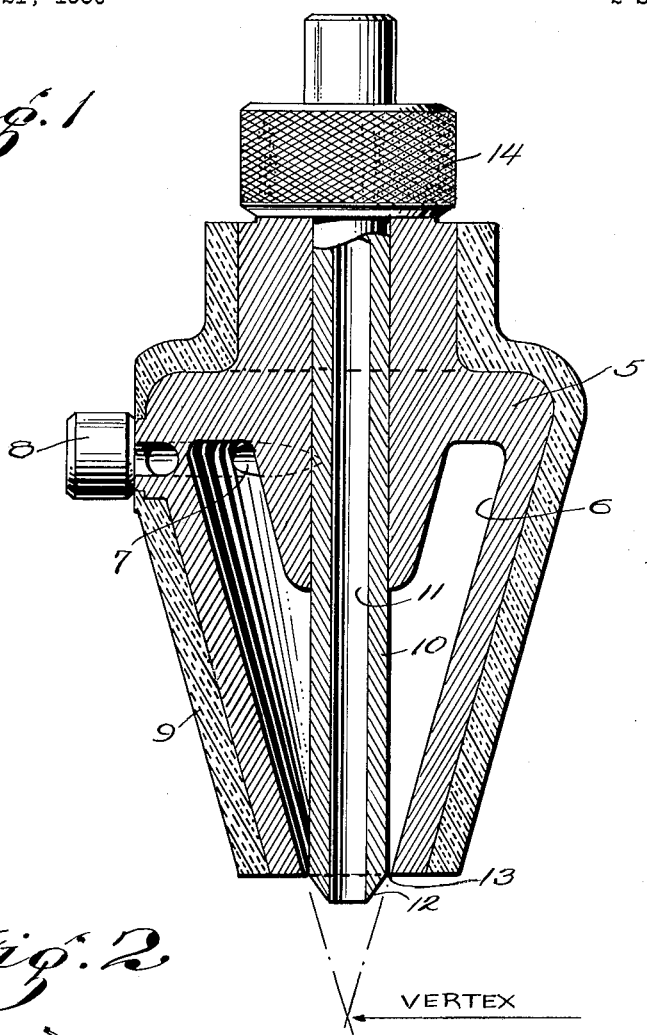
Fig. 1 is a diametric cross section through the preferred nozzle.

Referring first to Fig. 1, the nozzle comprises a generally frusto-conical body 5 having a hollow chamber 6 on the inside and having a gas inlet 7 at the larger end of said chamber, with a coupling 8 to couple a gas supply pipe (not shown) to the nozzle. Due to the form of chamber 6 and the direction and location of the gas inlet, gas admitted under pressure to the chamber is forced to flow in a spiral path of ever-decreasing diameter with consequent ever-increasing velocity. The gas supplied may be atmospheric air or steam or nitrogen or other gas and ordinarily it will be at a high temperature as will be explained. A layer of insulation 9 is shown surrounding the nozzle to minimize heat losses. Arranged coaxially of the nozzle is a straight glass-feeding tube 10 having a smooth bore 11 of uniform diameter and having its discharge end beveled as at 12 and projecting slightly beyond the discharge opening 13 in the nozzle, the arrangement being such that discharge opening 13 is a narrow annular opening defined by the inside walls of body 5 and the outer walls of tube 10. It will be noted that this discharge opening is directed toward the point marked "Vertex," which is the vertex of the cone that coincides with the inner frusto-conical walls of chamber 6. The opposite end of tube 10 is to be connected to a vessel, pipe or conduit (not shown) feeding a supply of molten glass, preferably of low melting characteristics. Nut 14 threaded on tube 10 may adjust the size of the discharge opening by shifting the position of the slidable tube 10 longitudinally.

As the molten glass flows out of the feed tube 10 by gravity or under pressure, it will meet a whirling conical blast of heated gas whose velocity constantly increases until, as stated above, it reaches supersonic velocity at the "Vertex." The molten glass also reaches the "Vertex" and is there disrupted, forming a multitude of curly filaments and under some conditions straight filaments which may be collected on a slowly moving belt (not shown) or within a chamber (not shown) until a sufficient mass of the filaments has been collected, after which the mass may be removed for other processing. It will be understood that the nozzle may be placed in a highly heated chamber (not shown) whose temperature is automatically regulated. Frequently a battery of these nozzles will be placed in the heated chamber, all being fed from a common source of molten glass, thereby making for maximum production and a uniform product.

A particular procedure within the scope of the invention is as follows: Molten glass is fed into the inner or axially extending tube of the nozzle at low pressure. Gas, which may be air, nitrogen, carbon dioxide, or even superheated steam is led into the nozzle under pressure and emerges from the annular discharge opening in the nozzle as a whirling jet which converges to a point or "Vertex" as already mentioned. Apparently by virtue of the injector effect of this gas jet the stream of viscous molten glass is drawn to the "Vertex" and is there disrupted and separated into a multitude of fine fibers. Steam instead of heating the filaments, as might be expected, actually seems to cool them due to its expansion. The temperature of the gas stream should preferably be approximately 100° C. higher than the temperature of the glass used in the process, while the temperature of the molten glass within the inner tube of the nozzle should be at least 250° C. higher than its softening point, which is of course dependent on the composition of the glass.

Glasses of many different formulae may be used. The glasses identified in the table, below, are known to be entirely suitable for the process.

Table

| Glass | Composition [1] | Softening point, ° C. |
|---|---|---|
| Lead copper silicate | $PbO-CuO-SiO_2$ 0.5:0.5:1 | Appr. 400. |
| Lead borate | $PbO-B_2O_3$ 4:1 | 565. |
| Lead cobalt silicate | $PbO-CoO-SiO_2$ 0.5:0.5:1 | Appr. 600. |
| Sodium borate | $Na_2O-B_2O_3$ 1:3 | 720. |

[1] The numbers under the formulae show the molecular ratios.

Other glass compositions may be used, for example the following:

13.21 gm. $K_2CO_3$ (anhydrous)
28.22 gm. $Na_2CO_3$ (anhydrous powder)
4.92 gm. $Li_2CO_3$ (corresponding to 2.00 gm. $Li_2O$)
23.00 gm. $Al_2O_3$ (anhydrous)
11.98 gm. $H_3BO_3$
4.0 gm. ZnO
65.78 gm. 85% phosphoric acid (corresponding to 62.82 gm. 89% $H_3PO_4$)

The above composition is within the scope of Example 1(c) of the Grimm et al. Patent No. 2,227,082 dated December 31, 1940. Other glasses disclosed in said patent may be used, as all are said to have softening points of between 339° C. and 387° C.

The phosphoric acid was diluted with distilled water to about 250 ml. Potassium, sodium, and lithium carbonate in the amounts given above were mixed and transferred slowly in portions to the phosphoric acid. The beaker was covered during the operation to avoid loss by effervescence. After the development of carbon dioxide had stopped completely, the $Al_2O_3$, $H_3BO_3$ and ZnO were added in the amounts mentioned above. Then the beaker containing the mixture was dried at a temperature of 130° C. for about 24 hours. The dry material was then finely powdered in a mortar. A clear glass melt resulted when heating this powder in a porcelain crucible, at first for half an hour at 600° C. (which was accompanied by a vivid evolution of gas) and then increasing the temperature to 1250° C. The latter took about two hours.

Figure 2:
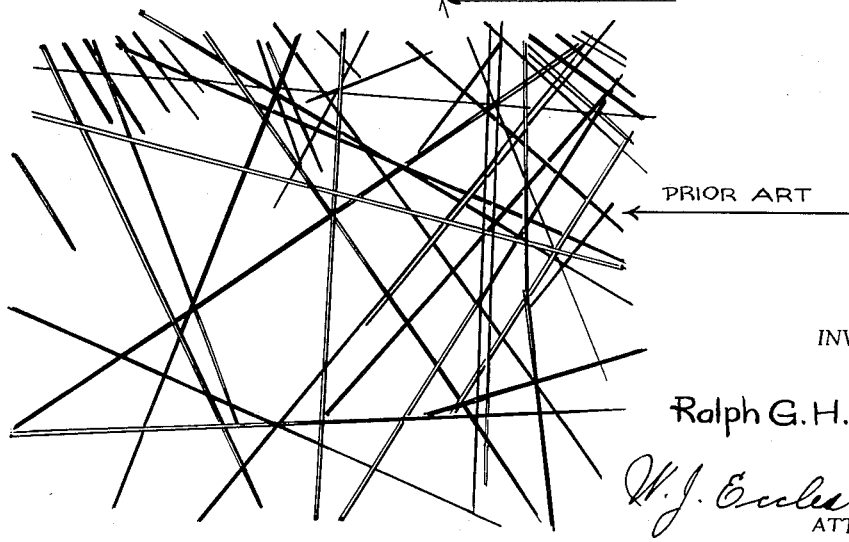
Fig. 2 is a full size reproduction of a photomicrograph (100×) showing straight glass fibers made in accordance with a previously known method.

In a successful run, the nozzle of Fig. 1 was connected through coupling 8 with a nitrogen cylinder (not shown) and by means of a reducing valve nitrogen was introduced at 60 p. s. i. pressure, with sufficient preheating to insure an actual temperature of about 700° C. The selected glass was melted in a muffle furnace and was transferred rapidly to the inner or axial tube 10 of the nozzle at a temperature of about 800° C. Flow was by gravity, with the nozzle pointing downward as shown in Fig. 1; however, the glass might be subjected to low pressure to increase the rate of flow. Small batches of glass filaments were discharged from the nozzle at intervals. Figs. 3 and 4 will give a fair idea of their structure, remembering that the magnification is 158:1. Fig. 2 shows for comparison ordinary straight glass fibers of the prior art (magnification 100:1). The average diameter of the filaments made by this process was found to be 6 microns, the range being, however, from 100 microns down to less than one micron.

There are great difficulties in making glass fibers with diameters of less than 6 microns by conventional commercial equipment. One such fiber, known as "superfine glass fiber," has been produced by Owens-Corning Fiberglas Corporation because of substantial savings in weight combined with insulating efficiency, which makes it useful for insulating military aircraft. It was made by extruding fine threads of glass under high pressure, which is a high cost process. The present invention requires no high pressure but only sufficient pressure to insure positive, continuous feeding to the "Vertex." Actually the weight of the glass itself may be sufficient, in some cases at least, to effect such feeding. Thus the invention provides a simple, economical method of producing glass fibers of below 100 microns' diameter.

The described nozzle will not clog or block up because of the use of a straight feed tube 10 of relatively large diameter to conduct the molten glass to the "Vertex." Not only may molten glass be fed through the tube: mixtures of molten glass with powdered metals such as platinum (for soft glass), tungsten (for Pyrex glass) and other metals and metallic alloys may be formed into filaments, provided the metals or alloys have about the same coefficient of expansion as the glass, and are not chemically changed thereby. Also mixtures of glass with other powdered or granulated fillers such as powdered asbbestos, bentonite, silica sand etc. may be sprayed. Even metalloids such as powdered seleneium may be added to the molten glass as fillers. The size of the particles of the filler may be smaller or larger than the average diameters of the fibers; if larger, the fibers will form envelopes with bulbous enlargements at spaced intervals, like the polymeric filaments disclosed in the above-mentioned R. K. Ladisch patent. Of course the size of the particles of the filler must never equal the diameter of the inner or feed tube of the nozzle. The addition of filling materials as described will greatly alter the color, appearance, feel and electrical and heat insulating characteristics of the filaments.

Various materials having dimensional stability at the operating temperatures and pressures may be used for making the nozzle. Up to about 1200° C., stainless steel is preferred, although up to about 900° C. other steels may be used. It is preferred that the feed tube carrying the molten glass be lined with platinum. The nozzle may be made from special alloys used in the glass industry having sufficient resistance to chemical attack and heat.

The entangled glass filaments of the invention readily form light weight mats or matting which have excellent heat-insulating characteristics and are therefore capable of use as filling materials for stuffing or lining articles of clothing, sleeping bags, heating pads, electric blankets, comforters, pillows, cushions, seat pads and upholstery, mattresses, life preservers, shock or crash pads and the like; also for insulating the walls of refrigerators and refrigerator cars and trucks, passenger cars, airplanes, ships and other vehicles, houses and industrial buildings, and portable shelters for military and other use. Products of the invention may also find a wide field of usefulness in acoustics and in the insulation of articles subjected to electrical stresses. As filtering media for fluids including air, mats formed from the described filaments may be found exceptionally useful.

Obviously, the described method is subject to many variations, provided they are within the scope of the appended claims.

Having described by invention, what I claim is:

1. A method of preparing filaments of glass, characterized by mixing molten glass with powdered solid material of such fineness that the powder particles are incorporated wholly within said filaments, said powdered solid material being selected from the group consisting of asbestos, bentonite and silica sand, and causing said molten glass to flow in a liquid stream to the vertex of a substantially cone-shaped, heated, rotating stream of gas or vapor traveling with a high velocity under such pressure as will break up the said stream of molten glass into fine inherently curly filaments.

2. A method of preparing filaments of glass, characterized by mixing molten glass with powdered asbestos of such fineness that the powder particles are incorporated wholly within said filaments, and causing said molten glass to flow in a liquid stream to the vertex of a substantially cone-shaped, heated, rotating stream of gas or vapor traveling with a high velocity under such pressure as will break up the said stream of molten glass into fine inherently curly filaments.

3. A method of preparing filaments of glass, characterized by mixing molten glass with powdered bentonite of such fineness that the powder particles are incorporated wholly within said filaments, and causing said molten glass to flow in a liquid stream to the vertex of a substantially cone-shaped, heated, rotating stream of gas or vapor traveling with a high velocity under such pressure as will break up the said stream of molten glass into fine inherently curly filaments.

4. A method of preparing filaments of glass, characterized by mixing molten glass with powdered silica sand of such fineness that the powder particles are incorporated wholly within said filaments, and causing said molten glass to flow in a liquid stream to the vertex of a substantially cone-shaped, heated, rotating stream of gas or vapor traveling with a high velocity under such pressure as will break up the said stream of molten glass into fine inherently curly filaments.

5. The method according to claim 1, wherein said stream of gas or vapor attains supersonic velocity at said vertex.

References Cited in the file of this patent

UNITED STATES PATENTS

| | | |
|---|---|---|
| 328,226 | Kennedy et al. | Oct. 13, 1885 |
| 1,408,871 | Enos | Mar. 7, 1922 |
| 1,459,499 | Brown et al. | June 19, 1923 |
| 1,659,291 | Hall | Feb. 14, 1928 |
| 1,953,457 | Baer | Apr. 3, 1934 |
| 2,206,060 | Slayter | July 2, 1940 |
| 2,264,285 | Bennett | Dec. 2, 1941 |
| 2,313,296 | Lamesch | Mar. 9, 1943 |
| 2,571,457 | Ladisch | Oct. 16, 1951 |

FOREIGN PATENTS

| | | |
|---|---|---|
| 481,690 | Great Britain | Mar. 16, 1938 |